United States Patent Office 3,705,193
Patented Dec. 5, 1972

3,705,193
PURIFICATION OF BENZOIC ACID
Michael W. Clark, Walnut Creek, Calif., assignor to The Dow Chemical Company, Midland, Mich.
No Drawing. Filed Dec. 8, 1969, Ser. No. 883,270
Int. Cl. C07c 51/42
U.S. Cl. 260—525               6 Claims

ABSTRACT OF THE DISCLOSURE

Benzoic acid made by the oxidation of toluene has improved purity and color stability if, prior to the final purification step, it is contacted with oxygen (air) at 125–290° C.

BACKGROUND OF THE INVENTION

Benzoic acid made by the oxidation of toluene is usually subjected to various treatments for the purpose of purification. These include extraction with water or other solvents, crystallization and distillation. While each of these techniques effects a certain degree of purification, it has been found that the final product is often off-color or, even if it initially is essentially colorless, it may become discolored during storage or use. Accordingly, it is an object of this invention to improve the purity, color and/or color stability of such acid.

SUMMARY OF THE INVENTION

According to the invention benzoic acid of improved purity, color or color stability is obtained if, prior to the final purification step, the acid is contacted with oxygen at a temperature of 125–290° C.

The oxygen in the process may be used as such or diluted with any inert gas, air being the preferred oxygen-containing gas. While the gas can be used at subatmospheric or superatmospheric pressure, it is generally most convenient to conduct the treatment at atmospheric pressure.

While some improvement is obtained at temperatures as low as 125° C., it is preferred that the temperature be above 200° in order to shorten the time required for adequate treatment. On the other hand, benzoic acid slowly decomposes at 290°, so a somewhat lower temperature is desirable. Thus, the preferred temperature is about 200–250° C.

The time required for the oxygen treatment varies widely, depending on temperature, degree of purification required, oxygen concentration, efficiency of contact between acid and oxygen,, etc. Some beneficial result is obtained within a few minutes; yet, under some circumstances, further improvement may be obtained by extending the treatment for many hours, or even several days. As a practical matter, treatment periods of about 1–18 hours are usually preferred.

The manner in which the benzoic acid is contacted with the oxygen-containing gas can be varied considerably. Since it involves liquid-gas contact, however, it is apparent that maximum intimate contact between the liquid and gas phases is desirable to facilitate the reaction. This can be achieved by any of the usual techniques for such contact, such as sparging the gas into the liquid, spraying the liquid into the gas, or flowing the two through a packed tower, using either counter-current or co-current flow.

SPECIFIC EMBODIMENTS OF THE INVENTION

The following examples illustrate the practice of the invention.

The benzoic acid used in the examples was "Industrial Grade," having a purity of 96–98% and a dark yellow to brown color. To obtain a standard of comparison, 300 g. of this material was distilled through a 30-plate glass column at a pressure of 30 mm. to produce 230 g. of a light yellow (APHA 300) purified acid. This was then subjected to an accelerated degradation test wherein it was held in contact with air at 200° C. for 1 hour. It was then a dark golden brown color, much darker than APHA 500.

Example 1

A 300 g. sample of the Industrial grade acid was held at 210° C. for 1 hour, during which air was sparged through it at the rate of 300 cc./min. During this time the color became very dark brown. The material was then distilled in the same still as was the standard to produce 225 g. of purified acid. This was then subjected to the 1 hour—200° C. degradation test. Its final color was light yellow (APHA 300). Its color was matched by a 10-fold dilution of the Industrial grade material with toluene, thus showing that it contained only one-tenth as much color bodies as the unoxidized crude.

Example 2

The oxidizer consisted of a 2-inch glass tube containing a series of ten glass plates spaced at 2-inch intervals. Each plate had a ⅛ inch hole drilled in its center. An air inlet was provided below the lowest plate.

The oxidizer was charged with 950 g. of the Industrial grade acid, the charge being evenly distributed on the ten plates. The oxidizer was then maintained at 210° C. while 100 cc./min. of air was blown through during a period of 8 hours. A 300 g. aliquot was then distilled as above, thus producing 220 g. of purified acid. After the degradation test the latter showed only very slight color (APHA 70), this being about ¼₀ of the color intensity of the standard of the control experiment above.

Similar improvement in color stability is obtained when the crude acid, after the oxidation treatment, is purified by means other than distillation; e.g., extraction with hot water and crystallization therefrom or decolorization with charcoal activated clay or the like.

I claim:
1. A process of improving the color stability of benzoic acid made by the oxidation of toluene, which acid tends to discolor during storage or exposure to elevated temperatures, said process comprising contacting the impure acid solely at 125–290° C. with oxygen prior to the final purification of the acid.
2. The process of claim 1 wherein the temperature is 200–250° C.
3. The process of claim 1 wherein the contact is effected by counter-current flow of the acid and oxygen in a packed tower.
4. The process of claim 1 wherein the oxygen is supplied in the form of air.
5. The process of claim 1 wherein the acid used in the process has a purity of at least about 96%.
6. The process of claim 1 when conducted at substantially atmospheric pressure.

References Cited
UNITED STATES PATENTS

| | | | |
|---|---|---|---|
| 3,529,021 | 9/1970 | Stancell et al. | 260—525 |
| 3,478,092 | 11/1969 | Ingwalson et al. | 260—525 |
| 3,187,038 | 6/1965 | Hundley | 260—524 |

LORRAINE A. WEINBERGER, Primary Examiner
R. S. WEISSBERG, Assistant Examiner